United States Patent
Glasgow et al.

(10) Patent No.: US 6,392,373 B1
(45) Date of Patent: May 21, 2002

(54) AUTOMATIC REVERSE MOTOR CONTROLLER

(75) Inventors: Kevin L. Glasgow, Campbellsport; Robert M. Crisp, Mukwonago, both of WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 09/731,438

(22) Filed: Dec. 6, 2000

(51) Int. Cl.[7] .................................................. H02P 7/28
(52) U.S. Cl. ...................... 318/430; 318/434; 318/490; 388/907; 388/931; 200/5 R; 200/1 R
(58) Field of Search ................................. 318/430–440, 318/254, 490, 569, 139, 280, 275; 388/802, 812, 907, 931, 937; 362/19; 200/1 R–5 R; 222/1, 327, 333, 391, 326, 390; 604/154, 131, 152, 155; 74/89, 15; 192/125 A

(56) References Cited

U.S. PATENT DOCUMENTS

| | | | |
|---|---|---|---|
| 3,699,411 A | | 10/1972 | Miller |
| 4,223,744 A | | 9/1980 | Lovingood |
| 4,249,117 A | * | 2/1981 | Leukhardt et al. .......... 173/181 |
| 4,412,158 A | | 10/1983 | Jefferson et al. |
| 4,463,293 A | | 7/1984 | Hornung et al. |
| 4,550,277 A | * | 10/1985 | Carney ........................ 318/245 |
| 4,628,233 A | * | 12/1986 | Bradus ........................ 318/434 |
| 4,680,513 A | | 7/1987 | Kennedy |
| 4,922,161 A | | 5/1990 | Gilliland et al. |
| RE33,379 E | * | 10/1990 | Bradus ........................ 388/812 |
| 5,138,243 A | | 8/1992 | Kress et al. |
| 5,343,382 A | | 8/1994 | Hale et al. |
| 5,471,122 A | | 11/1995 | Bilotti et al. |
| 5,556,009 A | * | 9/1996 | Motzko .................... 192/125 A |
| 5,594,306 A | | 1/1997 | Caporusso et al. |
| 5,672,155 A | * | 9/1997 | Riley et al. .................. 604/131 |
| 5,672,922 A | | 9/1997 | Raichle et al. |
| 5,747,953 A | | 5/1998 | Philipp |
| 5,762,239 A | * | 6/1998 | Cossette ...................... 222/326 |
| 5,775,539 A | * | 7/1998 | Bates et al. ..................... 222/1 |
| 6,013,991 A | * | 1/2000 | Philipp ........................ 318/114 |
| 6,025,683 A | | 2/2000 | Philipp |
| 6,114,826 A | | 9/2000 | Nishiura et al. |
| 6,318,874 B1 | * | 11/2001 | Matsunaga ................... 362/119 |

* cited by examiner

Primary Examiner—Paul Ip
(74) Attorney, Agent, or Firm—Michael Best & Friedric

(57) ABSTRACT

A method and apparatus to automatically reverse the motor of a dispensing gun or similar tool. The invention includes a controller that automatically reverses the direction of plunger movement and removes the plunger from contact with the back wall of a cartridge. The controller has a trigger switch that is coupled to a power source, such as a battery, and includes a main power on/off switch and a potentiometer. A protection or secondary switch is coupled in parallel to the main power on/off switch. A power supply circuit and a commutator are each coupled to the main and secondary switches. An overload sensor is coupled to the commutator. The controller includes a programmable device that is coupled to the power supply circuit, the potentiometer, the commutator, and the overload sensor. The programmable device is operable to sense actuation and deactuation of the main power on/off switch, read an electromotive force from the potentiometer, and, upon sensing deactuation of the main switch, send a control signal to the commutator to reverse current flow therethrough for a predetermined amount of time, and deactuate the secondary switch when the predetermined time has lapsed.

33 Claims, 6 Drawing Sheets

AUTOMATIC REVERSE MOTOR CONTROLLER

BACKGROUND OF THE INVENTION

The present invention relates to methods and devices used to control electric motors. More particularly, the invention relates to a method and an apparatus to automatically reverse an electric motor to control the operation of a tool, such as a dispensing gun, driven by the motor.

Hand powered dispensing guns have been available for many years. More recently, pneumatic and electric versions of hand-powered dispensing guns have been made available. Most dispensing guns, whether hand-powered, pneumatic, or electric, operate in a similar manner. A cartridge of material is placed in a cradle of the gun. The cartridge has a nozzle on one end and a disk or back wall on the other. The gun includes a plunger that is positioned coaxially with the back wall when the cartridge is placed in the cradle. The plunger contacts the back wall and moves it forward forcing the material in the cartridge out of the nozzle.

Electric-corded and battery-powered dispensing guns include an electric motor controlled by a trigger-actuated switch. Pulling the trigger closes the switch and electrically interconnects the motor to the power source. The motor drives a rack and pinion mechanism to advance the plunger. The plunger is thereby driven into the back wall of the cartridge to dispense the material. The operator can control the advancement of the plunger into the material cartridge and, thereby, control the application of material to the desired surface. Powered dispensing guns typically incorporate a speed control mechanism that allows the operator to control the speed of the flow of material out of the cartridge nozzle. As the operator becomes proficient with the tool, he or she can increase the speed at which the material is dispensed. The operator typically also has the option of retracting the plunger from the back wall of the cartridge. Operators remove the plunger from the cartridge when the cartridge is empty or when the job has been completed. Some dispensing guns have a manual switch to change the direction of the motor, thereby changing the direction of the plunger and retracting it away from the cartridge. Other dispensing guns have a manual mechanical release that allows the operator to physically pull the plunger out of contact with the cartridge.

While present dispensing guns are functional, they suffer from at least one deficiency. In general, once material is dispensed from a dispensing gun the material continues to flow out of the gun's nozzle after the gun's trigger mechanism has been released. After-flow (or oozing at the dispensing tip) leads to waste of material, nozzle fouling, dropped material, and additional clean up time.

Two primary reasons for the after-flow phenomenon are recognized. First, the usually thin-walled cartridge expands during plunger actuation and, according to the physical law that systems always attempt to return to the relaxed state, the cartridge wall relaxes after the plunger actuation. Since the back walls of most cartridges are designed to retain their forward-most position and the plunger of the dispensing gun is typically locked against a return movement, the relaxation of the cartridge wall leads to after-flow. Second, most dispensed compositions have a high viscosity and are at least marginally compressible. Thus, plunger actuation usually causes a substantial internal pressure buildup in the cartridge that, after the plunger is no longer forced forward, results in material leaking from the nozzle tip.

SUMMARY OF THE INVENTION

Accordingly, it would be desirable to have an improved method and device to control after-flow in a dispensing gun.

The invention provides a method and apparatus to automatically reverse the motor of a dispensing gun for a predetermined amount of time. An electronic motor controller automatically reverses the direction of plunger movement and removes the plunger from contact with the back wall of the cartridge. The automatic reversal of the motor to reverse plunger motion alleviates after-flow problems. The electronic motor controller includes a trigger switch, a power supply circuit, a commutator, an overload sensor, and a programmable device.

The trigger switch is coupled to a power source, such as a battery, and includes a main power on/off switch and a potentiometer. A protection or secondary switch is coupled in parallel to the main switch. The power supply circuit and the commutator are each coupled to the main and secondary switches. The overload sensor is coupled to the commutator and the programmable device. The programmable device is coupled to the power supply circuit, the potentiometer, the commutator, and the overload sensor. The programmable device is operable to sense actuation and deactuation of the main power on/off switch, read an electromotive force from the potentiometer, and, upon sensing deactuation of the main switch, send a control signal to the commutator to reverse current flow therethrough for a predetermined amount of time. The programmable device also deactuates the secondary switch when the predetermined time has lapsed. Reversing the direction of the motor upon release of the trigger switch reverses the direction of the plunger and stops forward movement of the back wall of the cartridge in the dispensing gun. As noted, automatically stopping the forward movement of the back wall alleviates after flow problems.

The invention may also be implemented in a method including sensing actuation of the trigger switch, reading a voltage from the trigger switch, generating a first control signal if the voltage from the trigger switch is equal to or greater than a predetermined value, sending the first control signal to a commutator to drive an electric motor in a first direction, generating a second control signal if the voltage from the trigger switch is equal to or less than a predetermined cut-off value, sending the second control signal to the commutator to drive the electric motor in a second direction, opposite the first direction, for a predetermined amount of time, and deactuating the secondary switch when the predetermined time has lapsed.

As is apparent from the above, it is an advantage of the present invention to provide an electronic motor control to automatically reverse a motor to prevent after-flow of material from a tool such as a dispensing gun. Other features and advantages of the present invention will become apparent by consideration of the detailed description and accompanying drawings.

DETAILED DESCRIPTION

Figure 1:
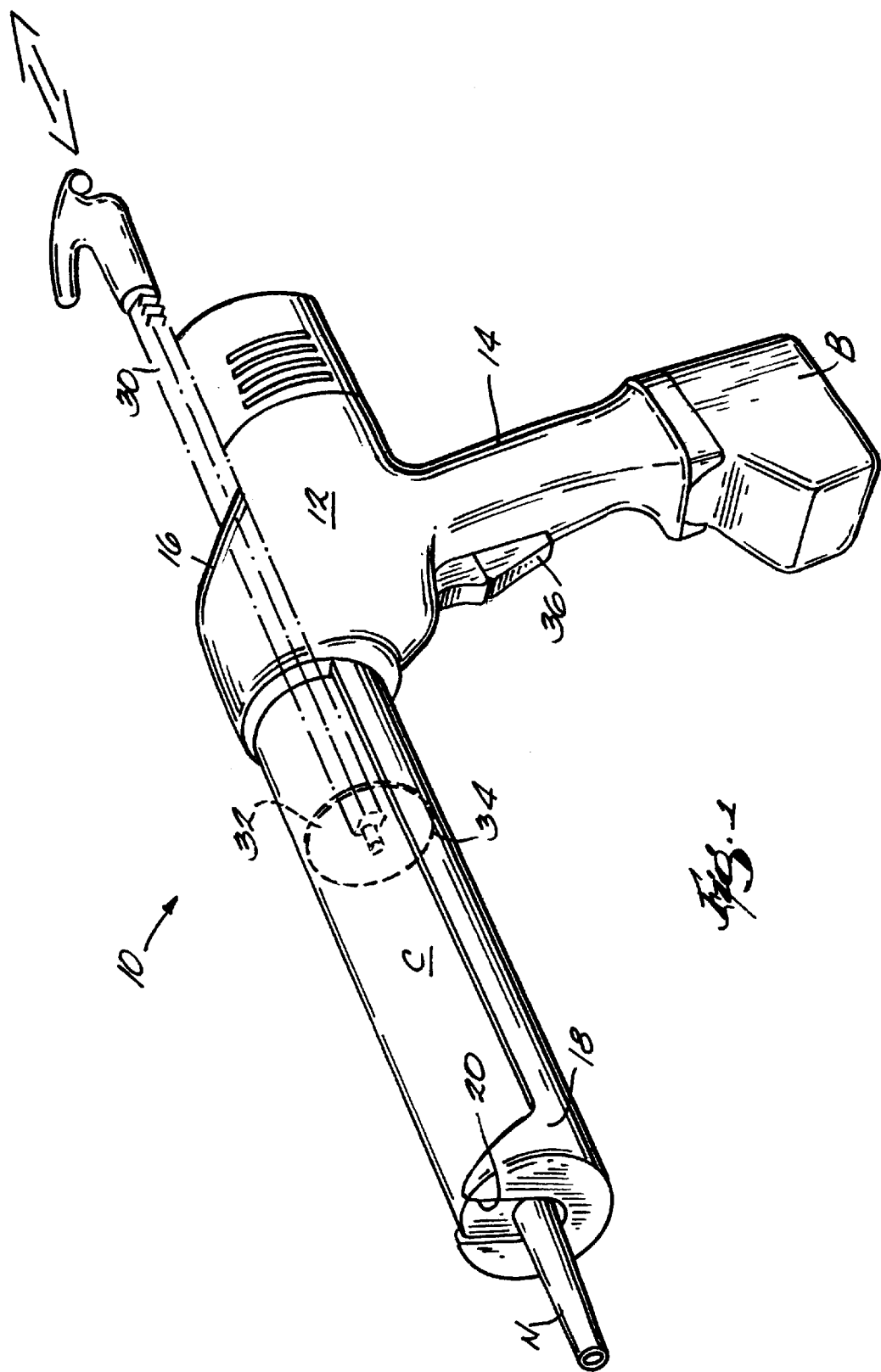
FIG. 1 is a perspective view of a battery-powered dispensing gun.

Before embodiments of the invention are explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A battery-powered dispensing gun 10 incorporating a motor controller of the invention is illustrated generally in FIG. 1. As shown, the dispensing gun 10 includes a pistol-shaped housing 12, including a handle 14 and a drive enclosure 16, and a sleeve or cradle 18 that extends from the drive enclosure 16. The cradle 18 is sized to receive commercially available tubes or cartridges of caulk, adhesive, and other similar materials. The cradle 18 includes an aperture 20 through which the nozzle N of a cartridge C projects. Components of the dispensing gun mounted within the drive enclosure 16 include a DC brush motor (not shown), a motor controller (discussed below), a drive linkage (not shown), and a drive rod 30. The dispensing gun utilizes a rack and pinion mechanism (which includes the drive rod 30 and the drive linkage) driven by the DC brush motor to drive a plunger 32 coupled to the forward end of the drive rod 30 into the back wall 34 of the cartridge C. A battery B is coupled to the handle 14. A finger-actuated trigger switch 36 is mounted on the forward side of handle 14.

Figure 2:
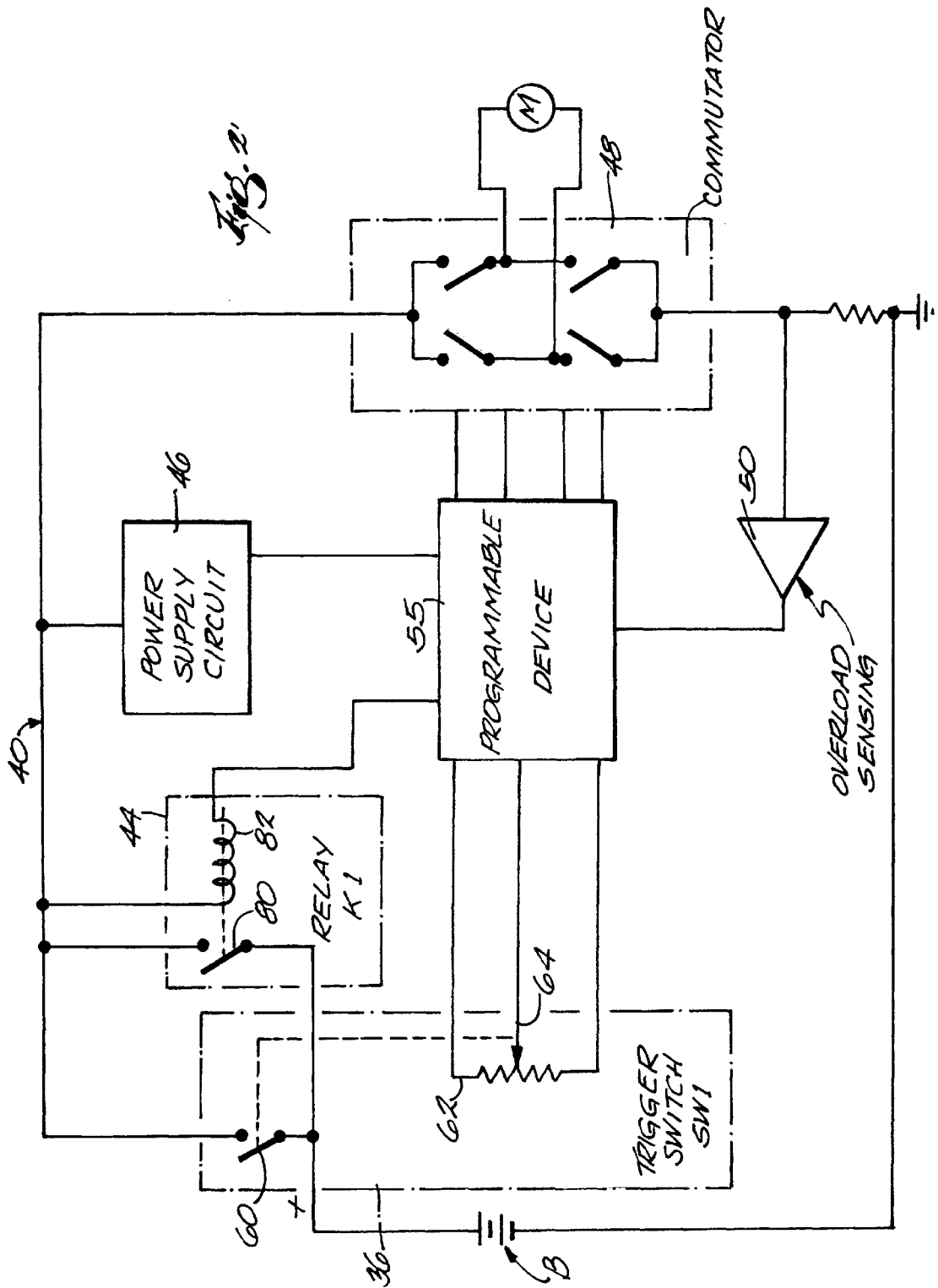
FIG. 2 is a schematic drawing of an apparatus embodying the invention.

A motor controller 40 of the invention is shown in FIG. 2. The motor controller 40 can be powered by a variety of sources such as a 12 volt or 14.4 volt cordless tool battery. The motor controller 40 includes: the trigger switch 36, a zero battery drain/auxiliary power circuit 44, a power supply circuit 46, a commutator 48, an overload sensor 50, and a programmable device 55. The motor controller 40 controls a motor M, which in the preferred embodiment is a DC brush motor. The functional blocks of FIG. 2 correspond to the blocks shown in broken lines in the detailed circuit schematic of FIG. 3.

The trigger switch 36 is coupled to the battery B and includes a main power on/off switch 60 and a potentiometer 62 having a wiper 64. The operator inputs control information to the motor controller 40 through the trigger switch 36. The main power on/off switch 60 is closed when the operator depresses the trigger switch 36 and the main power on/off switch 60 remains closed until the operator releases the trigger switch 36 to a predetermined point. The main power on/off switch 60 electrically couples the motor controller to the battery B when it is closed. The distance the operator depresses the trigger switch 36 correlates to the movement of the wiper 64 on the potentiometer 62.

Figure 3:
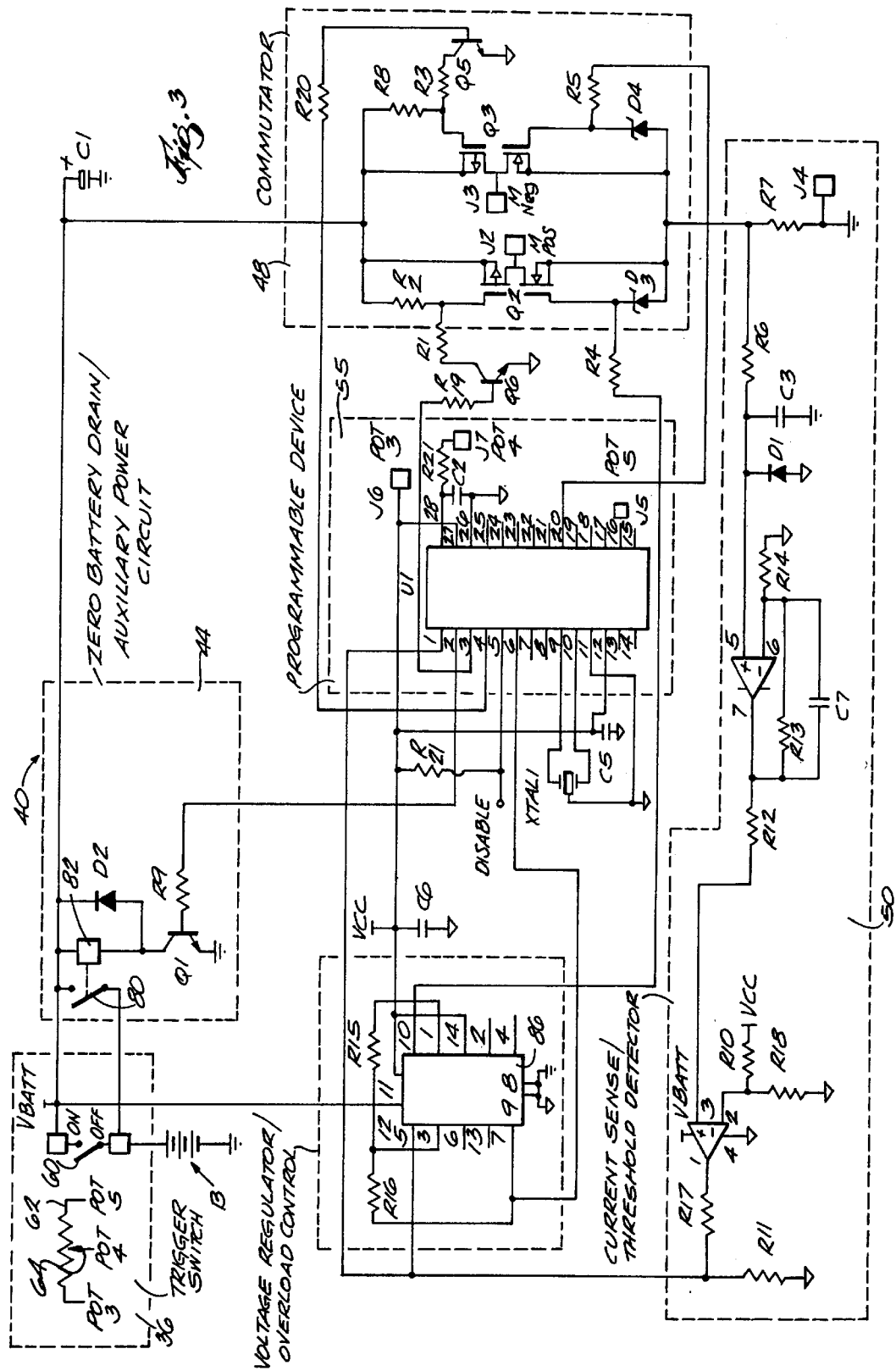
FIG. 3 is a detailed circuit diagram of an apparatus embodying the invention.
Figure 5:
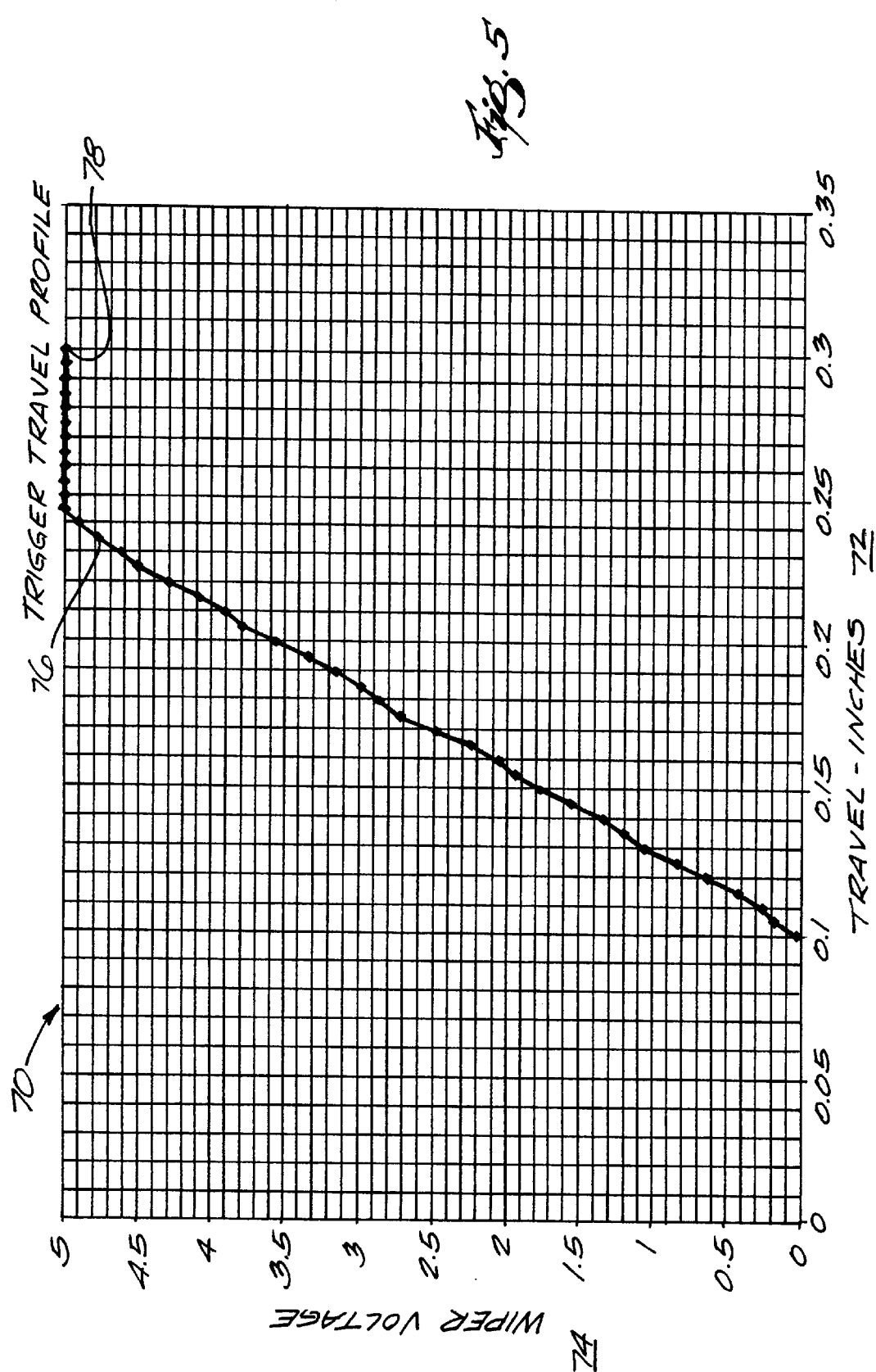
FIG. 5 is a graph of potentiometer (wiper) voltage versus travel.

As best seen by reference to FIG. 3, the electromotive force or voltage output by the potentiometer is based on the wiper voltage, at node POT 4, with respect to the voltages at nodes POT 3 and POT 5. Node POT 5 is the wiper ground reference and node POT 3 is equivalent to the upper rail voltage VCC supplied to the programmable device 55, which in one embodiment is 5 volts. The programmable device sets the wiper ground reference, node POT 5, to 0 volts to utilize the full 0–5 volt range for determination of operator actuation of the trigger switch 36. The full range of voltage is desirable for greatest resolution in determination of the trigger position. The farther the operator depresses the trigger switch, the greater the reading of the wiper voltage at node POT 4 will be. FIG. 5 illustrates a graph 70 having a horizontal axis 72 (travel), vertical axis 74 (voltage), and a curve 76. As can be seen by reference to curve 76, the trigger switch 36 exhibits a substantially linear response of wiper voltage versus travel. The curve 76 illustrates that the operator must depress the switch a certain distance before a wiper voltage is produced (a threshold voltage). One embodiment requires that the wiper voltage reading at node POT 4 be at least one volt before the commutator 48 receives a control signal to drive the motor in the forward direction. This minimum turn-on voltage requirement is utilized to prevent tool operation due to an unintended trigger actuation. The motor controller 40 is also designed such that a wiper voltage reading of below 0.2 volts is necessary to deactivate the motor M (the commutator no longer receives a control signal from the programmable device 55 to drive the motor in the forward direction).

The transition from and variability between a high turn-on voltage and a low cut-off voltage (or hysteresis) is utilized in the invention to prevent the nuisance of on-off cycling of the tool when the operator is attempting to finely feather the material onto a work surface. If hysteresis was not utilized, the motor controller might instruct the commutator to reverse the direction of the motor (as discussed in greater detail below) when the operator only intended to slightly reduce the speed of the flow of material. The lower turn-off voltage allows the operator to operate the tool just above the minimum turn-on voltage and then reduce the speed to a certain degree when necessary to achieve desired material delivery results. The operator can vary the distance the trigger switch 36 is depressed during operation of the tool to vary the speed at which material is dispensed. As illustrated by FIG. 5, when the trigger switch is fully depressed the maximum wiper voltage is obtained (see point 78). The maximum wiper voltage correlates to the maximum speed at which the motor M will operate. Once the 1 volt minimum turn-on voltage requirement is met, 0.2 volts correlates to the minimum speed at which the motor will operate.

The zero battery drain/auxiliary power circuit 44 is coupled in parallel to the main power on/off switch 60 and includes a secondary switch 80 and a relay 82. The secondary switch 80 is utilized to electrically couple the motor controller 40 to the battery B during reversal of the motor. The motor controller 40 is designed to automatically reverse the motor when the operator has released the trigger switch and other conditions (discussed below) have been met. When the trigger switch 36 is released the main power on/off switch 60 will be opened and does not electrically couple the motor controller 40 to the battery B. However, since the secondary switch 80 is mounted in parallel to the main power on/off switch 60, the secondary switch 80 is capable of electrically coupling the motor controller 40 to the battery B. To avoid the nuisance of the motor M automatically reversing when not necessary, such as after an unintended trigger actuation, the secondary switch 80 is closed only if the operator depresses the trigger switch a minimum distance for a certain amount of time. Although these settings could be varied depending upon the application at hand, in one embodiment the programmable device 55 does not send a control signal to the relay 82 to close the secondary switch 80 until a one volt wiper voltage is read for a minimum of two seconds. The secondary switch 80 then remains closed until the programmable device 55 sends a control signal to the relay 82 to open the secondary switch 80. This control signal is sent after the motor M has been reversed for the predetermined amount of time. When the secondary switch is opened the motor controller 40 is not electrically coupled to the battery B and the battery drain is reduced to zero.

The power supply circuit 46 is coupled to the main power on/off switch 60, the secondary switch 80, the overload sensor 50, the commutator 48, and the programmable device 55. The power supply circuit 46 is included in an integrated circuit 86 (see FIG. 3) that serves not only as a voltage regulator for the programmable device, but also as a level shifter for the pulse-width modulation signal for the commatator, and a current limiting control. The voltage regulator portion of the integrated circuit 86 converts the cordless tool battery voltage into the appropriate upper rail voltage VCC for the programmable device. The integrated circuit 86 for the preferred embodiment is a Texas Instruments TL3843 Current-Mode PWM Controller.

A commutator suitable for use in the invention is an H bridge, a specific example of which is a solid state dual MOSFET bridge. The commutator 48 is coupled to the motor M and controlled by the programmable device 55. When the motor M is being driven in the forward direction, a high side P-Channel MOSFET Q3 remains fully on to reduce power dissipation, and a low side N-Channel MOSFET Q2 is driven by a pulse-width modulation signal of varying duty cycle from the circuit 86. The duty cycle of the pulse-width modulation signal correlates to the distance the trigger switch 36 is depressed by the operator and, therefore, correlates to the speed at which the operator desires to dispense material. The higher the desired speed of the tool is, the closer to 1 the duty cycle of the pulse-width graph 88 with a horizontal axis 90 (travel), vertical axis 92 (percentage of duty cycle), and a response curve 94. The response curve 94 of FIG. 6 (percentage of duty cycle versus the travel of the trigger switch) is not linear (in contrast to the response of the wiper voltage versus the travel of the trigger switch illustrated in FIG. 5). The programmable device 55 utilizes a look-up table to correlate the wiper voltage reading to the appropriate duty cycle. The exponential type response of the response curve 94 is utilized for greater resolution of motor speed at the low end of trigger travel. The high degree of resolution assists the operator in delivery of the material to the desired surface. Especially for an inexperienced operator who is not completely oriented to the tool, the exponential response allows the operator to lay a more uniform bead of material. When the motor M is driven in the reverse direction the high side P-Channel MOSFET Q3 and the low side N-Channel MOSFET Q2 are turned fully on to provide a full power reverse direction of the motor M for the predetermined amount of time. The motor M is driven in reverse until the commutator 48 and the motor controller 40 are removed from electrical interconnection with the battery B, which occurs when the secondary switch 80 is opened.

The overload sensor 50 is coupled to the commutator 48 and the circuit 86. A current sense resistor samples the motor current directly. The sampled current is then filtered and conditioned. The maximum current draw by the DC brush motor in one embodiment is 3.0 amps. When the motor current is below this threshold, the threshold detector and current sense circuitry of the overload sensor 50 deliver a logic state 0 signal to I/O pins of the circuit 86 and the programmable device 55. If the I/O pin logic state is 0, the motor M is driven at the current pulse-width modulation duty cycle. If the motor current is above the maximum current draw threshold, the threshold detector and current sense circuitry deliver a logic state 1 signal to the I/O pins of the circuit 86 and the programmable device 55. The current limiting control circuitry of the circuit 86 adjusts the pulse-width modulation duty cycle to limit the current delivered to the motor M to the predefined maximum current draw. The programmable device 55 begins to decrement a timer such as a two second timer. If the timer is depleted, the programmable device 55 takes over the current limiting control function by folding back the current of the motor to 10% of the maximum current draw value. Once current limiting control is taken over by the programmable device 55, the only way the operator can regain control of the tool speed is by fully releasing the trigger switch 36, which resets the motor controller 40.

The main purpose of the overload sensor 50 is to prevent a force greater than 500 lb/in$^2$ from being applied by the plunger to the back wall 34 of the cartridge C. The battery-operated dispensing gun 10 illustrated in FIG. 1 is capable of producing approximately 2600 lb/in$^2$ of force deliverable by the plunger. If an operator of the dispensing gun was able to utilize all of this force the cartridge could burst with a resultant mess and loss of material. The likelihood of such a mishap increases when the material in the cartridge has a low viscosity, the material is frozen, or the nozzle N is plugged. The motor controller 40 is designed to cut back power of the drive mechanism if an overload condition persists. Regardless of how far the operator depresses the finger actuated trigger switch 36, the motor M will only be driven at 10% of maximum power if an overload condition is recognized for more than two seconds.

The programmable device 55 is coupled to the power supply circuit 46, the potentiometer 62, the commutator 48, the relay 82 of the zero battery drain/auxiliary power circuit 44, and the overload sensor 50. The programmable device 55 is operable to sense the actuation and deactuation of the main switch 60, read an electromotive force from the potentiometer 62, and upon sensing deactuation of the main on/off switch, send a control signal to the commutator 48 to reverse current flow therethrough for a predetermined amount of time. After the current has been reversed through the commutator 48 for the predetermined time, a different control signal is sent to the relay 82, which opens the secondary switch and disconnects the motor controller 40 from the battery B. Power to the motor controller 40 is shut off so the battery B is not drained when the tool is not in use. In the preferred embodiment, the programmable device 55 is a Zilog 16 MHz Z86C83 micro-controller.

Figure 4:
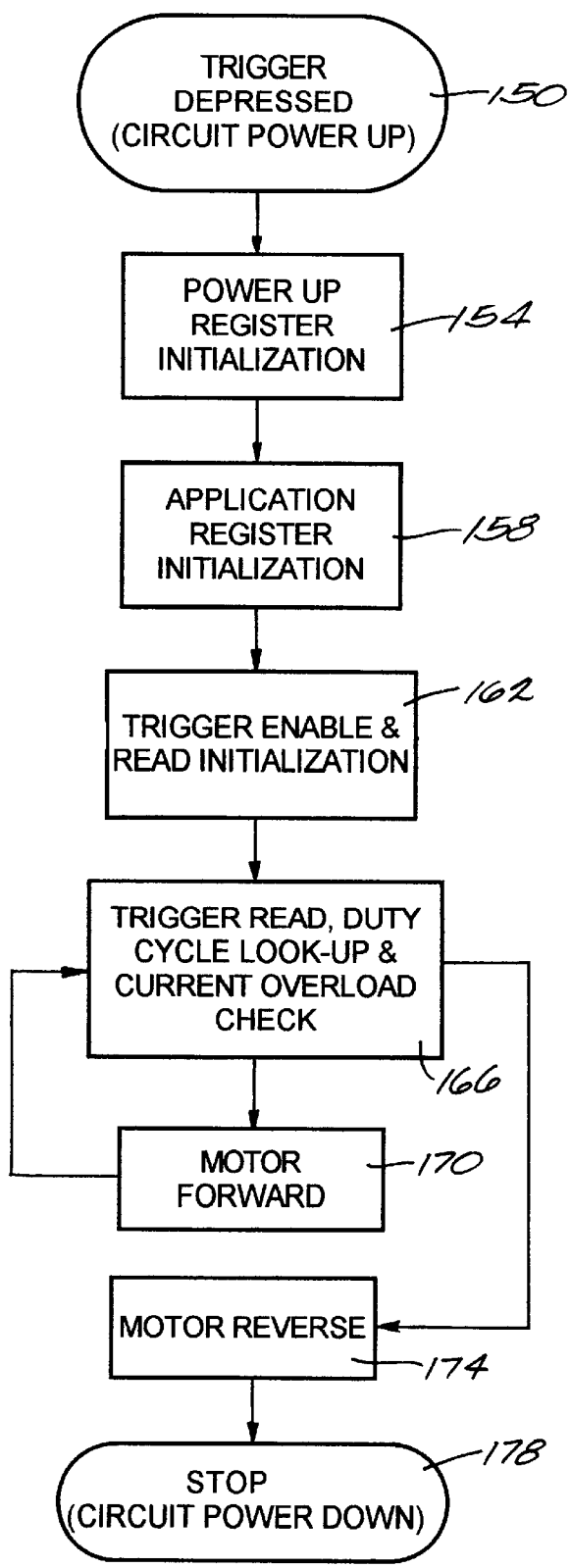
FIG. 4 is a flow chart of software used in the invention.

The software used by the programmable device 55 to operate the motor controller 40 is illustrated in the flow chart of FIG. 4. Before the software is executed, the motor controller 40 is powered up. In order to power up the motor controller 40, the operator must depress the trigger switch 36 as shown in step 150. The main power on/off switch 60 is closed when the trigger switch 36 is depressed, coupling the battery B to the motor controller 40.

As shown at step 154, Power Up Register Initialization, the software performs initialization by setting-up and configuring the system registers of the programmable device 55. The system registers include the hardware port control registers, port I/O registers, various timer registers, and the interrupt control registers. The programmable device 55 system registers are used for operation of the programmable device 55 and for interfacing of the programmable device 55 with the other components of the motor controller 40.

As shown at step 158, Application Register Initialization, the software clears all general-purpose programmable device registers and sets up and configures programmable device registers used for the automatic motor reversal application. Registers are specifically initialized with values for TRIGGER ON TIME, TRIGGER READ TIME, and CURRENT OVERLOAD TIME. The registers initialized with these values act as timers that can be decremented once a certain condition is met. For example, TRIGGER ON TIME is initialized to 2000, which corresponds to two seconds. If the programmable device 55 senses the main power on/off switch 60 is on and the potentiometer wiper voltage is greater than one volt, the TRIGGER ON TIME timer is decremented. If the above conditions continue and the TRIGGER ON TIME timer is depleted, the secondary switch is closed and the programmable device 55 performs a motor reverse.

As shown at step 162, Trigger Enable and Read Initialization, the software initializes the registers that are required to perform analog-to-digital conversion of the wiper voltage (node POT 4) read from the potentiometer 62. The software also enables the external trigger switch potentiometer wiper ground reference pin, which is electrically coupled to a pin of the programmable device 55. The pin is set to the logic 0 state. Setting the potentiometer ground to the logic 0 state allows for a full 0–5 volt range to be applied to the trigger switch potentiometer wiper. Allowing for the full five-volt range increases the resolution of speed control the operator can achieve.

As shown at step 166, Trigger Read, Duty Cycle Look-up and Overload Check, the software executes functions that occur during normal operation of the tool. Specifically, the software performs a read of the current trigger switch position, determines a new pulse-width modulation duty cycle for driving the motor, and checks the overload sensor.

The Trigger Read aspect of step 166 performs an analog-to-digital conversion of the voltage (node POT 4) read from the trigger switch potentiometer wiper. The wiper voltage will range from 0–5 volts. The current trigger position corresponds to the wiper voltage read, 0 volts corresponds to a trigger switch that is fully released or inadvertently slightly depressed (less than 0.1 inches), and 5 volts corresponds to a fully depressed trigger switch. The result of the analog-to-digital conversion is analyzed to determine if code execution should transfer back to perform further analog-to-digital conversions of the wiper voltage, perform a Duty Cycle Look-up, or perform a motor reverse.

If the software determines that the wiper voltage (node POT 4) is greater than the minimum turn-on level, a Duty Cycle Look-up executes. The software determines what the duty cycle should be for the current trigger switch position. The current wiper voltage obtained in the Trigger Read is compared to a stored, predefined table of wiper voltages and corresponding duty cycle values. When the current wiper voltage matches a voltage in the look-up table, the value of the duty cycle associated with that voltage is stored in a timer register. This timer register is used to control an internal timer used in step 170, Motor Forward, to control the duty cycle of the pulse-width modulation signal that drives the low side N-channel MOSFET Q2.

If a Duty Cycle Look-up is performed then the condition has been met for the TRIGGER ON TIME timer to be decremented. If the value of the wiper voltage obtained via a Trigger Read remains above the turn-on level until the TRIGGER ON TIME timer is depleted, the programmable device 55 sends a control signal to the relay 82 to close the secondary switch 80. After the secondary switch 80 has closed, if the trigger switch is fully released, execution transfers to step 174, Motor Reverse. If the wiper voltage does not reach the minimum turn-on voltage for the defined time, execution is not transferred to step 174.

Once the above steps are completed, an overload condition check is conducted on the motor M. The current draw of the motor is to be kept under the maximum current draw to limit the force the plunger exerts on the back wall 34 of the cartridge C. The software performs this operation by checking the logic state of the I/O pin connected to the overload sensor 50. If the software detects a logic state 0, no further action is performed and code execution is transferred to step 170, Motor Forward. If the software detects a logic state 1, the CURRENT OVERLOAD TIME timer initialized in step 158 is decremented and execution is transferred to step 170. If the software detects a logic state 1 at the I/O pin connected to the overload sensor 50 long enough to deplete the timer, a predefined, relatively low duty cycle is loaded into the internal timer register. Once the predefined duty cycle is loaded into the internal timer register no further duty cycle lookups are performed. Rather, the duty cycle is fixed at the predefined low level to prevent motor overload. The duty cycle stays in this state until the operator fully releases the trigger switch 36, thereby resetting the motor controller 40. Execution is similarly transferred to step 170 to perform the Motor Forward control. However, as explained above, the speed of the motor will only be at 10% of full power.

At step 170, Motor Forward, the software configures and sends appropriate signals to the I/O pans that control the commutator 48 and generates the duty cycle. After the software has configured the I/O pins for forward operation of the motor M, the software turns the high side P-Channel MOSFET Q3 fully on to reduce power dissipation. The software sends a pulse-width modulation signal to the low side N-Channel MOSFET Q2 to provide a variable speed function. The duty cycle of the pulse-width modulation signal is determined by using the duty cycle from the look-up table loaded into the internal timer at step 166. After a single period of the duty cycle is completed, Ihe software decrements the TRIGGER READ register counter initialized in step 158 and returns to step 170 and performs another period of the duty cycle. Once the TRIGGER READ register counter is depleted, execution is transferred back to step 166. A new trigger switch position is then determined and, if the value of the wiper voltage is above the turn-on level, a new duty cycle is determined from the look-up table. The new duty cycle is loaded into the internal timer register. Code execution is then again transferred back to step 170 with the new duty cycle loaded and the motor control I/O pin timing adjusted accordingly. This cycle repeats itself until one of the conditions noted causes the cycle to end.

At step 174, Motor Reverse, the I/O pins that control the commutator 48 and disable the relay 82 are configured. After the software has configured the pins for reverse operation of the motor M, the software turns on the high side P-Channel MOSFET Q3 and the low side N-Channel MOSFET Q2 fully for a predefined time. The predefined time of the preferred embodiment is 0.5 seconds. The predefined time needs to be long enough to drive the plunger in reverse until it is no longer in contact with the back wall of the cartridge C. It is advantageous to reverse the motor only long enough to move the plunger from contact with the back wall 34 of the cartridge C. If the motor reverses further than the necessary distance, time is wasted driving the plunger forward to the back wall of the cartridge when the operator wishes to resume use of the tool. The predefined time is stored in a timer register initialized in step 158. Once that timer register is depleted, the software sends a control signal to the relay 82, disabling the relay 82 and thereby opening the secondary switch 80. These actions disconnect the motor controller 40 from electrical interconnection with the battery B. The motor controller is powered down when the tool is not being used to prevent unnecessary draining of the battery power.

In addition to the features noted above, the controller 40 may be configured with additional features such as an auto-reverse disable mechanism, a nozzle blowout mechanism, and a software trigger lock. As best seen by reference to FIG. 3, the programmable device 55 has several available input pins that may be used to input additional information regarding desired operating features. For example, the programmable device 55 may receive a disable signal from a switch (not shown) or similar device along a disable line DISABLE. Upon reading a signal on the pin associated with the disable signal, the programmable device, when properly programmed to react to the condition of having a disable signal, deactivates, or ignores those conditions that cause the device to reverse the motor when the trigger switch is released. An auto-reverse disable feature might be useful when a dispensing gun is used at low speeds to apply small amounts of material.

In addition to a disable switch, a nozzle blowout input could be supplied through a switch (not shown) or similar mechanism to override the current overload functions of the invention. When so configured, the controller 40 would allow an operator to apply maximum current to the motor and, therefore, maximum force to the plunger to forcefully drive the back wall of the cartridge. Such a feature would be useful to clear a plugged nozzle of a cartridge. Finally, the controller could be configured with a software trigger lock. Such a lock could be configured such that the tool would not operate until appropriate inputs from the trigger switch or other inputs mechanisms were received by the programmable device 55. Such a trigger lock would enhance safety by reducing inadvertent actuation of the device controlled by the controller 40. A software trigger lock could also act as a theft deterrence device, making it nearly impossible for individuals lacking knowledge of the software unlock inputs to use the device.

It should be apparent from the discussion above and to those of ordinary skill in the art that the exact configuration of the controller could be varied. For example, many of the individual components describe above could be combined on a single integrated circuit or chip and features and components could be implemented in either hardware or software. It should also be recognized that the controller 40 could be utilized in other electric tools, not just dispensing guns, where an automatic reverse function would be of benefit.

Various features and advantages of the invention are set forth in the following claims.

What is claimed is:

1. A controller for an electric motor powered by a power source, the controller comprising:
   a trigger switch capable of being coupled to the power source;
   a secondary switch coupled in a parallel path to the trigger switch;
   a power supply circuit coupled to the trigger switch;
   a commutator coupled to the trigger and secondary switches; and
   a programmable device coupled to the power supply circuit, the trigger switch, and the commutator, the programmable device operable to sense actuation and deactuation of the trigger switch, read an electromotive force from the trigger switch, and, upon sensing deactuation of the trigger switch, send a control signal to the commutator to reverse current flow therethrough for a predetermined amount of time, and deactuate the secondary switch when the predetermined time has lapsed.

2. A controller as claimed in claim 1, wherein the power supply circuit includes a voltage regulator.

3. A controller as claimed in claim 1, further comprising a disable switch coupled to the programmable device and wherein the programmable device is operable to disable its reverse current function when it receives a predetermined signal from the disable switch.

4. A controller as claimed in claim 1, wherein the commutator includes an H bridge.

5. A controller as claimed in claim 1, wherein the secondary switch includes a relay.

6. A controller as claimed in claim 1, wherein the trigger switch includes a main switch and a potentiometer.

7. A controller as claimed in claim 6, wherein the programmable device is programmed to send a forward control signal to the commutator when the potentiometer outputs a predetermined threshold voltage.

8. A controller as claimed in claim 7, wherein the programmable device is programmed to send a deactivation signal to the commutator when the potentiometer outputs a predetermined cut-off voltage.

9. A controller as claimed in claim 1, wherein the programmable device is programmed to send a second control signal to the commutator to control the speed of an electric motor.

10. A controller as claimed in claim 9, wherein the programmable device is programmed to adjust a duty cycle of the second control signal.

11. A controller as claimed in claim 10, wherein the programmable device is programmed to adjust the duty cycle of the second control signal based on the distance the trigger switch is depressed.

12. A controller as claimed in claim 9, wherein after the programmable device senses actuation of the trigger switch the programmable device is programmed to adjust the duty cycle of the second control signal.

13. A controller as claimed in claim 1, further comprising an overload sensor coupled to the commutator and operable to produce an overload signal.

14. A controller as claimed in claim 13, wherein the overload sensor includes an amplifier.

15. A controller as claimed in claim 13, wherein the programmable device is programmed to reduce the current output by the commutator if the overload signal exceeds a predetermined value for a predetermined amount of time.

16. A method of reversing an electric motor in a power tool that is coupled to a power source and has a trigger switch and a secondary switch coupled in parallel to the trigger switch, the method comprising:
   sensing actuation of the trigger switch;
   reading a voltage from the trigger switch;
   generating a first control signal if the voltage from the trigger switch is equal to or greater than a predetermined value;
   sending the first control signal to a commutator to drive the electric motor in a first direction;
   generating a second control signal if the voltage from the trigger switch is equal to or less than a predetermined cut-off value;
   sending the second control signal to the commutator to drive the electric motor in a second direction, opposite the first direction, for a predetermined amount of time, and deactuating the secondary switch when the predetermined time has lapsed.

17. A method as claimed in claim 16, further comprising controlling the duty cycle of the first control signal based on the voltage from the trigger switch.

18. A method as claimed in claim 16, further comprising sensing a current in the commutator.

19. A method as claimed in claim 18, further comprising limiting the current supplied to the commutator if the sensed current exceeds a predetermined value for a predetermined amount of time.

20. A method as claimed in claim 16, further comprising sensing the condition of a disable switch.

21. A method as claimed in claim 20, further comprising skipping 1) generating a second control signal, 2) sending the second control signal to the commutator to drive the electric motor in a second direction, and 3) deactuating the secondary switch when the disable switch is in a predefined condition.

22. A method as claimed in claim 16, wherein reading a voltage from the trigger switch includes reading a voltage from a potentiometer.

23. An electric dispensing gun having a plunger, an electric motor, and a controller to automatically reverse the direction of plunger movement in the dispensing gun, the controller comprising:
   a trigger switch capable of being coupled to a power source;
   a power circuit coupled to the trigger switch, the power circuit having a secondary switch;
   a programmable device coupled to the power circuit and trigger switch;
   a commutator coupled to the programmable device and the power circuit; and
   an overload sensor coupled to the programmable device and the power circuit and operable to produce an overload signal,
   the programmable device operable to sense actuation and deactuation of the trigger switch, and, upon sensing actuation of the trigger switch, to send a control signal to the commutator, and upon sensing deactuation of the trigger switch, to send a control signal to the commutator to reverse current flow therethrough for a predetermined amount of time, the programmable device further operable to deactuate the secondary switch when the predetermined time has lapsed, and to adjust the control signal if the overload signal exceeds a predetermined limit.

24. An electric dispensing gun as claimed in claim 23, further comprising a disable switch coupled to the programmable device and wherein the programmable controller is operable to disable its reverse current function when it receives a predetermined signal from the disable switch.

25. An electric dispensing gun as claimed in claim 23, wherein the commutator includes an H bridge.

26. An electric dispensing gun as claimed in claim 23, wherein the secondary switch includes a relay.

27. An electric dispensing gun as claimed in claim 23, wherein the trigger switch includes a main switch and a potentiometer.

28. An electric dispensing gun as claimed in claim 27, wherein the programmable device is programmed to send the control signal to the commutator when the potentiometer outputs a predetermined threshold voltage.

29. An electric dispensing gun as claimed in claim 28, wherein the programmable device is programmed to send a deactivation signal to the commutator when the potentiometer outputs a predetermined cut-off voltage.

30. An electric dispensing gun as claimed in claim 23, wherein the programmable device is programmed to send a second control signal to the commutator to control the speed of the electric motor.

31. An electric dispensing gun as claimed in claim 30, wherein the programmable device is programmed to adjust a pulse-width modulation duty cycle of the second control signal.

32. An electric dispensing gun as claimed in claim 30, wherein the programmable device is programmed to adjust the duty cycle of the second control signal based on a information from the trigger switch.

33. An electric dispensing gun as claimed in claim 23, wherein the overload sensor includes an amplifier.

* * * * *

UNITED STATES PATENT AND TRADEMARK OFFICE
CERTIFICATE OF CORRECTION

PATENT NO.   : 6,392,373 B1
DATED        : May 21, 2002
INVENTOR(S)  : Kevin L. Glasgow et al.

Figure 6:
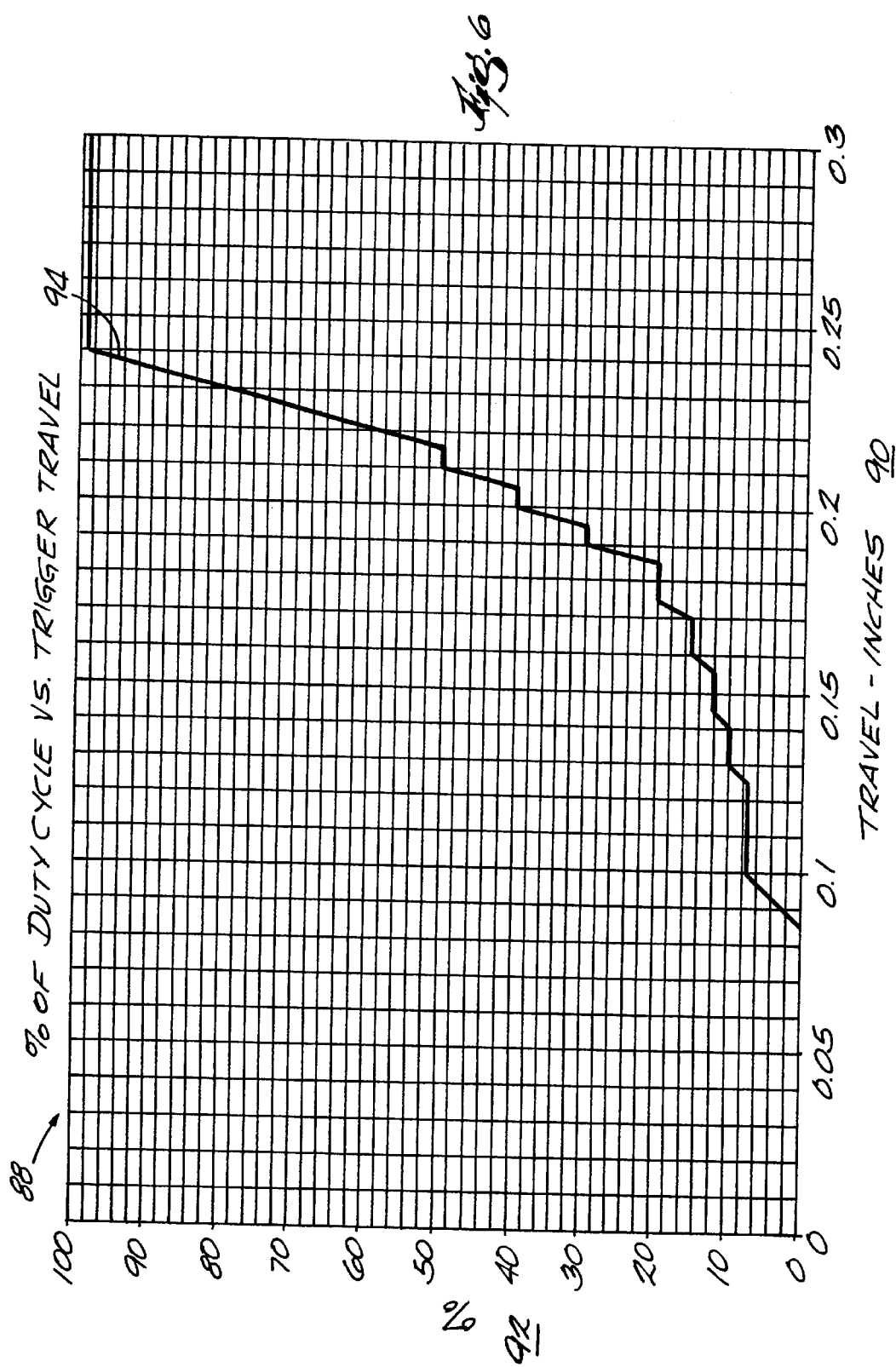
FIG. 6 is a graph of duty cycle versus trigger travel.

It is certified that error appears in the above-identified patent and that said Letters Patent is hereby corrected as shown below:

<u>Column 5,</u>
Line 29, insert "modulation will be. Fig. 6 illustrates a" before -- graph 88 --.

Signed and Sealed this

Eleventh Day of March, 2003

JAMES E. ROGAN
*Director of the United States Patent and Trademark Office*